Nov. 1, 1932. J. FRASER 1,885,517
FLOW METER FOR THE MEASUREMENT OF LIQUID
Filed May 25, 1931
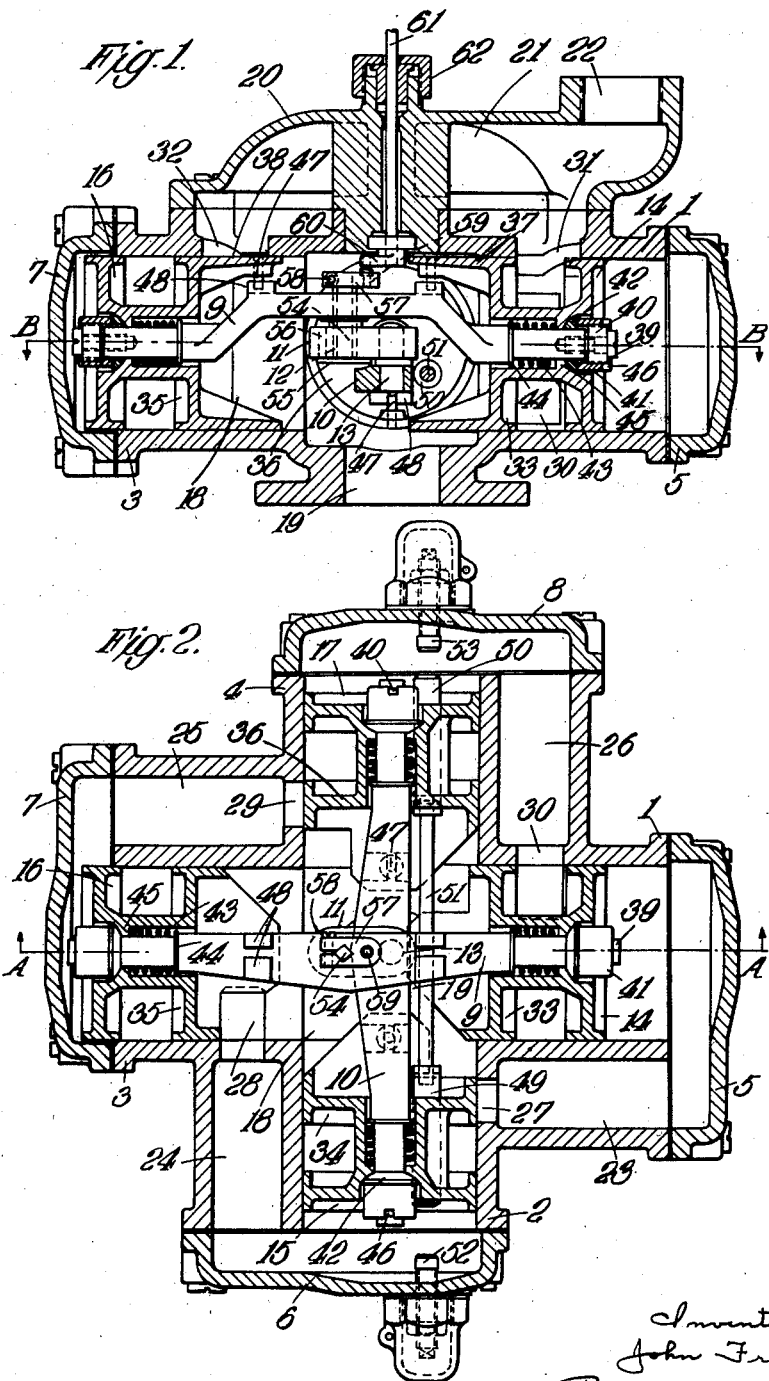

Patented Nov. 1, 1932                                                    1,885,517

UNITED STATES PATENT OFFICE

JOHN FRASER, OF LECKMELM BY GARVE, SCOTLAND, ASSIGNOR, BY MESNE ASSIGNMENTS, TO ANGLO-PERSIAN OIL COMPANY, LIMITED, OF LONDON, ENGLAND

FLOW METER FOR THE MEASUREMENT OF LIQUID

Application filed May 25, 1931, Serial No. 539,706, and in Great Britain May 29, 1930.

The present invention relates to flow meters for the measurement of liquid of the type in which the liquid enters and is then delivered from radially arranged cylinders fitted with pistons mounted in opposite pairs respectively on common piston rods which are connected in the vicinity of their intersection by a link arranged to secure sequential operation of the pistons. Admission and delivery chambers respectively common to all the cylinders are connected therewith by suitable passages and ports, and in a known form of meter inlet and discharge of liquid is under the control of a common rotary valve actuated by motion of the pistons. However, chiefly owing to the fact that, on account of the essential action of this type of meter, the provision of valve lap is practically precluded, extreme fineness of setting as between the controlling valve and each of the cylinders is necessary and, in the case of a valve common to all the cylinders, would demand accuracy of workmanship beyond what is commercially feasible. In addition, there exists in connection with such a rotary valve an unbalanced pressure whereby it is held on its seat and the freedom of operation of the parts is thereby reduced, thus entailing an increased pressure drop across the meter, with its attendant disadvantages. It is one of the main objects of the present invention to construct a meter free from these drawbacks and having as few working parts as possible and therefore possessing increased simplicity and reliability.

According to the invention individual valves are actuated respectively in accordance with the motions of the various pistons for the purpose, in respect of each cylinder, of placing one end of the next cylinder in sequence alternately in communication with the common admission and delivery chambers. Thus each valve may be accurately set with respect to its co-operating piston. Conveniently the valves take the form of piston valves associated respectively with the measuring pistons. The relative arrangement of the valves and co-operating ports is such that having regard to the relative movements of the piston rods as determined by their connecting link, when a given piston has reached the outer end of its stroke the outer end of its cylinder is placed in communication with the common admission chamber; at the same time the outer end of the diametrically opposed cylinder is placed in communication with the common delivery chamber. Thus each cylinder is alternately filled and discharged at its outer end.

In order that the invention may be clearly understood and readily carried into effect it will now be described more fully with reference to the accompanying drawing which illustrates, by way of example, a construction of meter in accordance with the invention having four cylinders and wherein:—

Figure 1 is a sectional elevation on the line A—A of Figure 2 and

Figure 2 is a sectional plan on the line B—B of Figure 1.

In the meter illustrated the four cylinders 1, 2, 3, 4 are formed in a single casting and are provided with covers 5, 6, 7, 8. The two piston rods 9, 10, which are at right angles and are, as shown, suitably shaped so that they may intersect without fouling each other, are connected together by a link 11 embracing pins 12, 13 rigidly fitted into the rods, so that when one pair of pistons 14, 16 is at the end of its stroke the other pair 15, 17 is in mid-stroke and vice versa. In the drawing the pistons 14, 16 are shown as at the left-hand end of their stroke and the pistons 15, 17 as at mid-stroke.

As will be seen, the casting in which the cylinders are bored provides a central common space or chamber 18 into which the inner ends of all the cylinders open. This chamber 18 is provided with an inlet 19 adapted to be connected to the source of supply of liquid. Above the cylinders there is located a cover 20 enclosing a space 21 constituting a common delivery or outlet chamber and having an outlet 22 for delivery of liquid. On the side of each cylinder there is a channel 23, 24, 25, 26, the cylinder covers being so formed respectively as to provide communication between each channel and the outer end of the cylinder with which it is associated. At their inner ends the channels communicate by means of ports 27, 28, 29, 30 respectively with the cylinders cyclically next in order. Such ports open into these cylinders in proximity to their inner ends so that in each case the outer end of one cylinder communicates with the inner end of the next and thence, in certain positions of the valves mentioned below, with the common inlet chamber 18. Correspondingly the outlet chamber 21 is in communication with each of the cylinders by ports, two of which 31, 32 namely those in the cylinders 1 and 3, are seen in Figure 1.

Associated with each main piston and, in the construction illustrated, integral with it is a piston valve 33, 34, 35, 36 adapted to cooperate with the inlet ports 27, 28, 29, 30 and with the outlet ports 31, 32 as well as with those outlet ports associated with the cylinders 2 and 4, but not seen in the drawing. For the purpose of preventing direct communication between the chambers 18 and 21 each piston valve is formed with an extension, those on the piston valves 33 and 35 adapted to close the ports 31 and 32 respectively being seen at 37 and 38. As regards the main portions of the piston valves cooperating with the inlet ports 27, 28, 29 and 30, as seen in Figure 2 they function to close the ports when the respective pistons are in mid-stroke and the other pair of pistons are at one extremity or other of their stroke and are, therefore, stationary. Stoppage of the pair of pistons at the end of their stroke is, however, of only momentary duration and during that short interval it is necessary that the piston valves which are at mid-stroke shall pass completely across the corresponding inlet ports, from which it follows that, as indicated in Figure 2, only a very small lap is allowable, that is to say, that the width of the operative surface of the piston valve can be only very slightly greater than that of the inlet port. A very accurate adjustment of the piston valve on its rod is therefore necessary and as such accuracy is beyond that ordinarily employed in manufacturing methods, means for adjusting the piston valves on their respective rods is provided. For this purpose there is fitted at each end of each rod a screw 39 adapted to retain a cylindrical block 40, carrying, by means of an external thread, a nut 41 having a washer 42 having a spherical, segmental surface adapted to bear on a machined surface of the piston casting. Within that casting there is provided a helical spring 43 in compression between a collar 44 on the piston rod and an internal flange 45 on the piston casting. Adjustment is effected by securing the screwed cylinder 40 on to the end of the piston rod by means of the screw 39 and then adjusting the piston valve accurately with regard to its cooperating inlet port by turning the nut 41 against the action of the spring 43. When the required adjustment has been made the cylinder 40 is riveted over into recesses 46 formed in the nut 41, so that it becomes substantially integral therewith. Thereafter if removal of the piston and piston valve from the rod be desired, this may be accomplished by release of the screw 39, but on replacement of the piston and piston valve and tightening of this screw the valve will be in the correct adjustment. Rotation of the piston and piston valves relatively to their respective piston rods is prevented by pins 47 projecting inwardly from the piston valves and adapted to engage lugs 48 on the piston rods.

In order to provide adjustment for accuracy of delivery there are fitted to one pair of pistons 15, 17 two plungers 49, 50 connected by a rod 51 and normally moving with the pistons 15 and 17. Located in the cylinder covers 6 and 8 respectively are stops 52, 53 adjustable by screw or other means and adapted to co-operate respectively with the plungers 49 and 50. Thus, by adjustment of these stops, the plungers on account of the abutting thereof against one or other of the stops before completion of the positive stroke may be prevented from partaking in the complete reciprocatory movement of the pistons 15, 17 and a consequent variation of the delivery of liquid ensues, whereby the desired adjustment of such delivery may be secured. Although both the stops 52, 53 have been shown as adjustable this is only absolutely necessary in respect of one of the stops, the other being, if desired, fixed.

Delivery of liquid may be indicated or recorded by any suitable form of mechanism which does not, however, in itself form part of the present invention. Such mechanism may be actuated from any moving member of the meter, but for this purpose the motion of the link 11 is most conveniently employed. A point of this link on the line joining the centres of the pins 12 and 13 and lying midway between them describes a circle and this fact may be utilized in the actuation of a counter or recorder by rotary motion. As, in order that the thrust on the pistons may be truly axial, the link 11 is situated between the piston rods 9 and 10 and is, therefore, not very accessible for connection directly to an external counter, the pin 12 is made hollow so that there may be inserted within it a rod 54 having, at its lower end, a flange 55 provided with a pin 56 adapted to enter an aperture in the link 11, so that both rod and link turn relatively to the hollow pin 12. The upper end of the rod 54 is, as indicated in Figure 2, formed of square section for the reception of a lever 57 detachably fixed on it by means of a screw 58. This lever is provided with a pin 59 fitted so that its centre line passes through the point mentioned above as possessing circular motion. The pin 59 in turn engages with a crank 60 on a spindle 61 which, by means of a gland 62, passes to the outside of the meter and serves to actuate indicating or recording apparatus in known manner.

The sequence of operations in the meter will now be explained, it being borne in mind that in normal operation the meter is filled with the liquid under measurement. The central chamber 18 is in direct communication through the inlet 19 with the supply of liquid under pressure and hence such supply pressure is exerted on the inwardly directed faces of all the piston valves and accordingly the forces acting on the opposite valves in each pair are balanced and are not effective in producing reciprocation of the pistons. The action is produced in the following manner:—

Considering the elements as initially in the relative positions shown in the drawing, liquid finds its way from the inlet chamber 18 through the port 28 and channel 24 to the outer end of the cylinder 2, and consequently acts on the outer side of the piston 15 impelling it and its connected elements in the upward direction as seen in Figure 2. The cylinder 2 is thus filled with liquid from its outer end while at the same time liquid already in the cylinder 4 is expelled through the channel 26 and port 30, finding its way into the space between the piston 14 and piston valve 33 and thence through the outlet port 31 of the cylinder 1 to the outlet chamber 21 whence it is delivered by the outlet 22. Simultaneously, immediately after the pistons 15, 17 have passed their mid-position, uncovering of the ports 27 and 29 commences and consequently liquid from the inlet chamber 18 is admitted through the port 29 and channel 25 to the outer end of the cylinder 3 and thus assists in impelling the pistons 14 and 16 toward the right as seen in the figures. The cylinder 3 is thus filled from the outer end and at the same time delivery of liquid takes place from the outer end of the cylinder 1 via the channel 23, port 27, space between the piston 15 and piston valve 34 and the outlet port of the cylinder 2 leading to the outlet chamber 21. From the representation of the outlet ports 31 and 32 it will be realized that uncovering of these ports begins before the corresponding piston valve has reached the mid-position on its inward stroke. When the pistons 15, 17 have reached the upper ends of their stroke the pistons 14, 16 have arrived at their mid-position, that is to say, the relative positions of the two pairs of pistons have been interchanged and mutatis mutandis the above described sequence of operations is repeated.

Under certain circumstances, it may be found necessary to increase the width of the piston valves relatively to their co-operating ports 27, 28, 29 and 30, thus increasing the lap to such an extent that the respective ports co-operating with the piston valves which are passing through their mid-position have not begun to be uncovered by the time that return motion of the pistons which are at the end of their stroke has commenced and thus the required outlet for liquid to be delivered from one of the cylinders is not provided.

What I claim and desire to secure by Letters Patent of the United States is:—

1. A flow meter comprising in combination radially arranged cylinders lying mutually opposite in pairs, a piston in each cylinder, piston rods respectively connecting opposite pistons in pairs, means including a common connecting link jointed to each of said rods, each of said cylinders having a port and a channel whereby communication is made between one cylinder and the cylinder next in sequential order, an admission chamber in communication with each of said cylinders, a delivery chamber, there being a port in each cylinder leading into said delivery chamber, a valve rigidly connected with each of said pistons and in operative relation with said ports in said corresponding cylinder and means for adjusting each valve relatively to its co-operating ports and for ensuring that, on replacement of the said valve after removal, such adjustment shall be undisturbed.

2. A flow meter as in claim 1, wherein the means for adjusting each valve comprises abutments respectively on said valve and on said piston rod, a spring bearing on each of said abutments, a cylindrical block in proximity to the end of said piston rod, a screw inserted through said block and engaging said piston rod, a nut in threaded engagement with said block and having a recess in proximity to said block and a washer in contact with said nut and with said valve, said block being riveted over into said recess after said valve has been adjusted relatively to its co-operating ports.

3. A flow meter, comprising, in combination radially arranged cylinders mutually opposite in pairs, a piston in each cylinder, piston rods respectively connecting opposite pistons in pairs, means including a common connecting link jointed to each of said rods, each of said cylinders having a port and a channel whereby communication is made between one cylinder and the cylinder next in sequential order, an admission chamber in communication with each of said cylinders, a delivery chamber, there being a port in each cylinder leading into said delivery chamber, a valve rigidly connected with each of said pistons and in operative relation with said ports in said corresponding cylinder, an auxiliary plunger inserted in and adapted to slide through each piston in one of said pairs of pistons, a rod rigidly attached to each of said auxiliary plungers, a cover at the outer end of each of said cylinders containing said pistons having said auxiliary plungers, a stop supported by each of said covers, each of said stops being in alignment and operative relation with one of said auxiliary plungers, and means for adjusting at least one of said stops toward or away from said auxiliary plunger with which it co-operates.

JOHN FRASER.